(12) United States Patent
Hsu et al.

(10) Patent No.: US 6,472,067 B1
(45) Date of Patent: Oct. 29, 2002

(54) NON-FLAMMABLE POLYMER COMPOSITE PANELS

(75) Inventors: Ming-Ta S. Hsu, San Jose, CA (US); Timothy S. Chen, San Jose, CA (US)

(73) Assignee: HC Chem Research and Service Corp., San Jose, CA (US)

( * ) Notice: Subject to any disclaimer, the term of this patent is extended or adjusted under 35 U.S.C. 154(b) by 0 days.

(21) Appl. No.: 09/963,384

(22) Filed: Sep. 27, 2001

(51) Int. Cl.[7] .................................................. B32B 9/00
(52) U.S. Cl. ....................... 428/367; 428/408; 428/391; 428/396; 428/447; 428/688; 156/307.1; 156/307.3; 156/311; 156/312
(58) Field of Search ................................. 428/366, 902, 428/257, 367, 408, 271, 273, 391, 396, 404, 446, 447, 448, 688, 689; 156/307.1, 306.3, 306.9, 307.3, 311, 312

(56) References Cited

U.S. PATENT DOCUMENTS

| 4,100,322 A | * | 7/1978 | Seibold et al. ............... 428/257 |
| 5,154,787 A | | 10/1992 | Gardner ....................... 156/166 |
| 5,618,766 A | * | 4/1997 | Leiser et al. .................. 501/87 |
| 5,985,433 A | | 11/1999 | Leiser ...................... 428/312.6 |
| 6,225,248 B1 | | 5/2001 | Leiser ........................ 501/95.2 |

* cited by examiner

*Primary Examiner*—Merrick Dixon
(74) *Attorney, Agent, or Firm*—James V. Tura

(57) ABSTRACT

Non-flammable, fibrous-siloxane cured composites derived from the polymerization of dialkoxysilanes, trialkoxysilanes and tetraalkoxysilanes, in an aqueous medium, to obtain viscous polysiloxane resins. These siloxane resins are used to impregnate or coat various fibrous materials such as carbon fibers or glass cloth which are subsequently subjected to heat and pressure to form cured, non-flammable siloxane-impregnated composites e.g. panels having a density of about 1 to 3 g/cc. and a limited oxygen index above 30. These non-flammable, fibrous-siloxane composites are particularly useful in the manufacture of fire-proof materials for various transportation vehicles and for building materials e.g. panels as a fire barrier.

20 Claims, No Drawings

NON-FLAMMABLE POLYMER COMPOSITE PANELS

BACKGROUND OF THE INVENTION

1. Field of the Invention

This invention relates to non-flammable, polymeric siloxane resins comprising atoms of silicon, hydrogen, carbon and oxygen, and more particularly, to siloxane resins useful with reinforcing fibers to make cured non-flammable fire-resistant panels having a density ranging from about 1 to 3 g/cc. and a limited oxygen index (LOI) above 30. The preferred siloxane polymer resins are characterized as having lower alkyl groups e.g. 1 to 12 carbons attached to the silicon atoms. These viscous polymeric siloxane resins function as an adhesive for the non-flammable reinforcing fibers, such as glass fiber (fiberglass), alumina fiber, silica fiber, carbon fibers and the like to form strong non-flammable composites at relative low temperatures and pressures. The cured siloxane-fiber composites can be formed into various materials e.g. panels which are non-flammable and therefore particularly useful as a fire barrier in manufacturing building materials and the like.

The need for lightweight, high strength, cost competitive parts by the aircraft, automotive, building and other industries has led to a demand for improved strength to weight ratio materials such as matrix composites. Polymeric matrix composites are known to have weight savings of at least 20% over their metal counterparts as well as having much lower operational and maintenance costs. Composites of fibers continue to find applications in futuristic and exotic demanding systems. Composites made with polymeric resins and reinforced with various fibers e.g. fiberglass, carbon or organic fibers possess high-specific strength modulus and low coefficient of thermal expansion, thus making these composites very attractive for space, transportation, construction and household applications. In the field of polymers, it is known to use glass and carbon fibers to reinforce resin materials; see U.S. Pat. Nos. 4,856,146 and 4,857,385. Currently, polymeric resins used in preparing fibrous composites are primarily epoxy, phenolic, bismaleimide, polyester or polyimide resins. However, these polymeric resins have low limited-oxygen indices (LOI) and therefore are highly flammable in air. The development of non-flammable polymeric siloxane resins with a high limited-oxygen index (LOI), as taught by this invention, solves the flammability problem Previously, silicon-based polymeric materials were developed for instantly repairing damaged Space Shuttle tiles (U.S. Pat. No. 5,985,433). This particular silicon-based polymeric material, after curing, does not easily burn when exposed to flame. The novel silicon-based polymeric resins of this invention, however, provides non-flammable fibrous composites having densities ranging from about 1 to 3 g/cc. and a high limited-oxygen index which means these composites are particularly useful for building materials e.g. panels and for designing future transportation vehicles, such as aircraft, boats, automobiles and the like. As an added terrestrial benefit, these non-flammable siloxane composites could dramatically reduce fatalities during a fire from smoke and flames, if building interiors were protected by panels of this non-flammable composite. If these non-burning lightweight composites were installed in the interiors of buildings, they would be a life saving devise.

2. Description of the Prior Art

In general, polymeric matrix composites are fiber-reinforced thermosetting or thermoplastic resin composites. However, all of the organic thermosetting resins, and most of the thermoplastic resins are flammable organic polymers; see Advanced Composites, edited by I. K. Partridge, Elsevier Applied Science, NY1989. It has been reported that both PEEK and PPS are fire-resistant thermoplastics composites. (Briggs, P. J. Leach, D. C., & Carlile, D. R., Mechanical and fire properties of aromatic polymer composites, and Proc. 3$^{rd}$ European Symposium on Spacecraft Materials in Space Environment, Noordwik Netherlands, Oct. 1–4, 1985; ESA-SP-232, November 1985) (Shue, R. S., Fire safety testing of PPS thermoplastic composites). Unfortunately, all of these materials require high processing at temperatures greater than 300° C.

SUMMARY OF THE INVENTION

This invention relates to ambient or low-temperature processing, of non-flammable and low-cost fibrous siloxane polymeric composites. The composites comprise at least one fiber reinforced silicon-based polymeric matrix. The reinforcing fibers include, for example, fiberglass, carbon fibers, aluminalsilicalboria fibers and the like. The silicon-based polymers comprise silicon, carbon, hydrogen and oxygen and are derived from the polymerization reaction of organodialkoxy silanes, organotrialkoxy silanes and tetraalkoxy silanes. More particularly, this invention relates to non-flammable fire-resistant composites derived from silicon-based polymeric resins reinforced with known fibers such as fiberglass or carbon fiber and the like. The silicon-based polymers comprise resins derived from the reaction of at least one dialkoxy and one or more trialkoxy/tetraalkoxy sitanes with water (such as di- and tri-/tetra-functional silanes) to form viscous siloxane resins.

The preferred di- and tri-tetra-functional silicon alkoxides have di- and tri-/tetra-oxygen functionality wherein the silicon alkoxide has two and three/four Si—O bonds, respectively. The silanes particularly useful in the practice of this invention include a combination of silanes with tri-/tetra- and di- oxygen functionality of the general formula $RSi(R^{I}O)_3/Si(R^{I}O)_4$ and $RR^{III}$—Si—$(OR^{II})_2$ wherein $R^{I}$ and $R^{II}$ are the same or different and represent alkyl hydrocarbon groups e.g. radicals of 1–12 carbons wherein R and $R^{III}$ are different or the same hydrocarbon groups as $R^{I}$ and $R^{II}$. The groups R and $R^{III}$ can be the same or different hydrocarbon groups of 1 to 12 carbons and include the alkyl, aryl, alkaryl, and aralkyl groups. One of the R and $R^{III}$ can be hydrogen. The hydrocarbon groups i.e. (—CH) contain carbon and hydrogen and include the straight or branched chains, and saturated or unsaturated groups of 1 to 12 carbons. In general, the number of carbon atoms in the hydrocarbon groups range from 1–12, and preferably from 1–8 and more preferably from 1–2.

A process of preparing non-flammable high-tensile strength, cured fibrous-siloxane composites having a density ranging from about 1 to 3 g/cc. and a limited oxygen index above 30 which comprises:

(a) polymerizing in an aqueous medium about 50 to 95 parts by weight of at least one trialkoxysilane, about 5.0 to 50 parts by weight of at least one dialkoxysilane, and 0 to 10 parts by weight of at least one tetraalkoxysilane to obtain liquid polyalkylsiloxane resins, (b) impregnating fibrous materials with an effective amount of said siloxane resins to obtain fibrous-siloxane prepregs, (c) drying said fibrous-siloxane prepregs, and (d) subsequently subjecting at least two plies of said fibrous-siloxane prepregs to pressures ranging from about 25 psi to 700 psi at temperatures ranging from about 50° to 300° C. to obtain said non-flammable cured fibrous-siloxane composites.

It is therefore an object of this invention to provide a process of preparing non-flammable, fibrous siloxane composites having densities ranging from 1 to 3 g/cc., high-temperature characteristics, light-weight, high-tensile strength and capable of being formed into various shapes.

It is another object of this invention to provide cured fibrous composites having densities ranging from about 1 to 3 g/cc. and limited oxygen index above 30. These siloxane resins are derived from the polymerization reaction of different alkoxy silanes including a combination of one or more dialkoxy silanes and tri-/tetra-alkoxy silanes, which are useful in preparing fire-resistance panels, having high-temperature characteristics, lightweight and high-tensile strength.

These and other objects of the invention will become apparent from a further and more detailed description of the invention.

DETAILED DESCRIPTION OF THE INVENTION

This invention relates to non-flammable, fiber reinforced, siloxane composites having a density ranging from about 1 to 3 g/cc. comprising silicon-based cured polymeric resins and to the method of preparing same. The silicon-based polymers are derived from the reaction of at least one di- and tri-/tetra-alkoxy silanes with at least stoichiometric amounts of water and contains atoms of silicon, carbon, hydrogen and oxygen. For purposes of this invention, the preferred di- and tri-/tetra-functional alkoxide reactants include the alkoxides of silicon having two, three and four Si—O bonds, respectively. Particularly preferred silanes comprise a combination of silanes with tetra-, tri-, and dioxygen functionality having the general formula $R''Si(OR')_3/Si(OR')_4$ and $R'''R$—Si $(OR')_2$ where $R, R', R''$ and $R'''$ are the same or different and represent hydrocarbon radicals of 1–12 carbons and wherein R or $R'''$ can be hydrogen. The term hydrocarbon, or organo groups are radicals comprising carbon and hydrogen (—CH) which may be straight or branched chain, saturated or unsaturated hydrocarbons. In general, the number of carbon atoms in the hydrocarbon or organo groups range from 1–12 and preferably from 1–8 and more preferably 1–6 carbons e.g. 1–4 or 1–2 carbons, wherein at least one of the hydrocarbon groups contain at least one carbon atoms e.g. methyl group. The $R, R', R''$, and $R'''$ groups of the above formulae are preferably lower alkyl groups, e.g. 1 to 8 carbons such as methyl, ethyl, propyl, isopropyl, butyl, isobutyl, pentyl, heptyl, hexyl, and the isomers, thereof and include the alkenyl or vinyl unsaturated groups such as vinyl, divinyl, propenes, butenes, etc. and various mixture thereof.

Specific examples of the preferred silanes useful for preparing the viscous siloxane resins of this invention include the alkyltrialkoxy silanes such as methyltrimethoxysilane $CH_3Si(OCH_3)_3$, ethyltrimethoxysilane, $C_2H_5Si(OCH_3)_3$, vinyltrimethoxysilane, $C_2H_3Si(OCH_3)_3$ and methyltriethoxysilane $CH_3Si(OC_2H_5)_3$. The tetraalkoxy silanes include tetramethoxysilane, tetraethoxysilane, tetrapropoxysilane. The alkyldialkoxy silanes include diethyldiethoxysilane $(C_2H_5)_2Si(OC_2H_5)_2$, diethydibutoxysilane $(C_2H_5)_2Si(OC_{49})_2$, dimethyldiethoxysilane $(CH_3)_2Si(OC_2H_5)_2$, methyldiethoxysilane $(CH_3)HSi(OC_2H_5)_2$, dimethyldimethoxysilane $(CH_3)_2Si(OCH_3)_2$, diphenyldimethoxysilane $(C_6H_5)_2Si(OCH_3)_2$, vinylmethyldiethoxysilane $(CH_2{:}CH)(CH_3)Si(OC_2H_5)_2$, divinyldiethoxysilane, and various combination thereof in various ratios.

The weight ratios between the dialkoxy silanes and the trialkoxy silanes range from about 50 to 95 parts by weight of the trialkoxy to about 5 to 50 parts by weight of the dialkoxy silanes and preferably from about 70 to 95 parts by weight of the trialkoxy silane to 5–30 parts by weight of the dialkoxy silanes. A small amount of the tetraalkoxy silanes e.g. 0 to 10 and preferably 1.0 to 10 or 5–10 parts by weight of tetraalkoxy silanes can be added to the silane reaction. The molar ratio of silicon, oxygen and carbon atoms in the siloxane resin used to prepare the composites is determined by the molar ratio of the di- and tri-/tetra-alkoxy silanes in the reaction. In some instances, the molar ratio of the silicon, oxygen, hydrogen, and carbon of the resin is determined by the molar ratio of the tri-/tetra-alkoxy silanes and the carbon content of the Si—C bonds in the dialkoxy and trialkoxy silanes. The siloxane polymers can be prepared by reacting the organo-alkoxysilanes in the presence of stoichiometric amounts of water, but generally the reaction takes place in an alcohol and water medium.

The amount of water in the aqueous medium ranges from about 30 to 70 percent by weight or about 30 to 55% by weight e.g 50% of the total amount of silanes in the reaction, and the alcohol ranges from about 30 to 70 percent by weight of the aqueous medium. The alcohol insures that a homogeneous solution is obtained. While it is convenient to use ethanol, other lower alcohol may be used alone or in admixture. Examples of the alcohol in the aqueous medium include methanol, ethanol, propanol, isopropanol, butanol, sec- and isobutanol, pentanol, and mixtures of such alcohols with water. Although the hydrolysis reaction may be completed by aging at ambient temperatures or by heating, in the practice of this invention, it is preferred to catalyze the reaction by the addition of a catalytic amount i.e. a very dilute solution ($<10^{-3}$ normal) of an inorganic acid (mineral acid) or base e.g. $HNO_3$, HCl, NaOH, $NH_4OH$, etc. to the reaction mixture. The hydrolysis reaction occurs under ambient conditions, however, heating to temperatures ranging from about 30°–50° C. is preferred in addition to the use of an acid or base catalyst. After hydrolysis, the solvent is evaporated by heating to about 50°–100° C. or by using a rotary evaporator to form a viscous liquid siloxane resin.

More specifically, in accordance with this invention, the reaction of the trialkoxy silanes and the dialkyoxy silanes takes place in the presence of an acid or base catalyst and in water or in an alcohol/water medium to form a hydrolyzed solution. After the solvent is evaporated, the hydrolyzed silanes are then condensed to a viscous siloxane resin. The polymerization reaction of the silanes to form the condensed siloxane resin is illustrated by the following:

Hydrolysis reaction

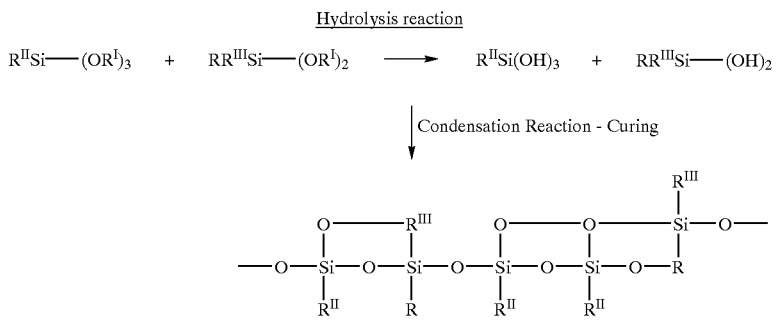

For purposes of this invention, the viscous liquid (silicon based polymer) must be a siloxane polymeric resin, as distinguished from a siloxane sol or gel, containing silicon, carbon, hydrogen and oxygen. After applying the liquid resin onto a fibrous material e.g. carbon fiber, filaments or cloth, the impregnated or coated cloth was dried at temperatures ranging up to 60° C. and stacked together e.g. 2 to 100 plies under mild or ambient heat i.e. up to 150° C. and pressure to form fully cured non-flammable fibrous-siloxane composites characterized as having a density ranging from about 1 to 3 g/cc. and a limited oxygen index above 30.

The following examples illustrate the preparation of the non-flammable, fibrous siloxane composites prepared in accordance with this invention.

EXAMPLE 1

Methyltrimethoxysilane (100 g) and dimethyldimethoxysilane (40 g) were mixed with 20 g. of alcohol and 30 g. of water. After adding 0.5 g. of $10^{-5}$N. of nitric acid, the hydrolysis reaction was completed within 60 min. The solution was then evaporated. About 50–75% of the solvent was evaporated and a viscous siloxane-resin liquid was formed. One piece of fiberglass cloth was coated with about 50% by weight of the cloth with the viscous liquid. The cloth prepreg was placed in an oven (~50° C.) to further remove the solvent. The dried cloth was cut to desired sizes. The cut pieces of cloth were then stacked and placed between a heated press. The number of ply was between 2–100. The cure temperatures range from about 100° C. to 200° C. and the pressure was between 50–500 psi. After the cure, a nonflammable, fire-resistant, fibrous siloxane composite having a density ranging from about 1 to 3 g/cc. was formed.

EXAMPLE 2

Tetraethoxysilane (10.0 g), methyltrimethoxysilane (80 g) and dimethyldiethoxysilane (10.0 g) were mixed with 60.0 g. of ethanol and 40.0 g. of water. After the mixture was reacted for about 4 hours the solvent was removed by evaporation to obtain a viscous liquid resin. One piece of fiberglass cloth was impregnated with the viscous liquid. The cloth was placed in an oven (~50° C.) to further remove the solvent. The dried cloth was cut to the desired size. The cut pieces of cloth were then stacked and placed between a heated press. The number of plies was 48. The cure temperature ranged from about 50–150° C. and the pressure ranged from about 50–500 psi. After the cure, a nonflammable fibrous siloxane composite having a density ranging from about 1 to 3 g/cc. was formed. The resin content in the composite ranged from about 30 to 50% by weight.

EXAMPLE 3

Methyltriethoxysilane (95 g) and dimethyldiethoxysilane (5 g) were mixed together with 50.0 g. of ethanol and 50.0 g. of water. After several hours stir, the solvent was removed by evaporation to form a viscous siloxane resin. Pieces of fiberglass cloth and carbon cloth were coated with the viscous resin. The cloths were placed in an oven (~50° C.) to further remove the solvent. The dried cloths were then cut to desired sizes. The cut cloths were then stacked and placed between a heated press. The number of plies was between 2–100. The cure temperature ranged from about 50–150° C. and the pressure ranged from about 50–500 psi. After the cure, a nonflammable, fire-resistant, fibrous siloxane composite was formed.

EXAMPLE 4

Tetramethoxysilane (5.0 g), Methyltrimethoxysilane (85 g) and dimethydiethoxysilane (10.0 g) were mixed together with 60 g. of ethanol and 40 g. of water and 1.0 g. of 0.0001 N.NaOH, and then stirred for about 4 hours. The solvent was removed by evaporation to form a viscous siloxane resin. Pieces of fiberglass and carbon cloth were coated with the viscous resin to form a prepreg. The cloths were placed in an oven (~50° C.) to further remove the solvent. The dried cloths were then cut to desired sizes. The cloths were then stacked and placed between a heated press. The number of plies ranged between 2–100. The cure temperature was about 50–150° C. and the pressure was about 50–500 psi. After completely curing the cloths, nonflammable fibrous siloxane composites were formed. Preferably, the cure temperatures range from about 50° to 250° C. and more preferably from 100° to 200° C.

The properties of the non-flammable siloxane fibrous composites e.g. fire-resistant panels of this invention are shown in Table I.

TABLE I

| Composite | Fiber | Resin Content % | Density g/cc | Tensile Strength Mpa(Ksi) | Tensile Modulus Gpa/Msi | Flexural Strength Mpa/(Ksi | LOI % |
|---|---|---|---|---|---|---|---|
| 1 | Fiberglass | 48.0 | 1.83 | 145.2/21.1 | 15.2/2.2 | 145.5/21.1 | >40 |
| 2 | Carbon | 37.0 | 1.47 | 367.6/53.3 | 21.7/3.15 | 88.9/12.89 | >30 |

In preparing the non-flammable, fire-resistant, fibrous composites of this invention, the fibers can be short fibers or whiskers, but are frequently continuous fibers consisting of one or more fibers in the form of filaments or cloth. Thus, the preferred fibrous materials employed in the composites are, for example, carbon, graphite, glass, asbestos, or boron fibers. The non-flammable fibrous composites of this invention comprise at least two plies e.g. 2–100 and preferably 2–48 plies of the fibrous material e.g. fiberglass cloth. The fibrous material is coated or impregnated with the reaction solution of the viscous siloxane resin in amounts ranging from about 25 to 200% by weight and preferably from about 50 to 100% by weight of the fibrous material. The cured non-flammable siloxane fibrous composites comprise about 20 to 60 percent by weight or 30 to 50 percent by weight of the cured siloxane resin and about 40 to 80 percent by weight or 50 to 70 percent by weight of the fibrous material. For example, continuous fibers can be coated with effective amounts of the siloxane resin and wound on a rotating drum. After sufficient fiber built-up on the drum, the fiber mat is removed from the drum and dried. The resulting mat or cloth i.e., "prepreg" is cut and laminated into the desired shape. Also a woven or pressed fabric of the reinforcing fibers can be coated with the siloxane resin and dried, after which it is formed into the desired shape by procedures known in the art of fabricating prepregs.

The term "fibrous material" includes fibers, filaments, continuous filaments, strands, bundles, whiskers, cloth, felt, and combinations thereof The fibrous material can be amorphous, crystalline, or mixture thereof The fibers may have various sizes and forms. Fibers may be monofilaments or tows of 100 to 6000 filaments. When used in preparing the composites of this invention they may be woven into fabrics, pressed into mats, or aligned to obtain the required physical properties. The use of whiskers and fibers to prepare polymeric composites is well known. However, whiskers are specifically characterized as relatively short, single-crystal fibers of small diameter, whereas fibers may be multicrystalline or amorphous and are sufficiently long to be used in woven bundles, tows or cloth.

Various embodiments and modifications of this invention will be apparent and can be made by those skilled in the art without departing from the spirit and scope of the invention as set forth in the appended claims.

What is claimed is:

1. A process of preparing non-flammable high-tensile strength, cured fibrous-siloxane composites having a density ranging from 1 to 3 g/cc. and a limited oxygen index above 30 which comprises:

(a) polymerizing in an aqueous medium about 50 to 95 parts by weight of at least one trialkoxysilane, about 5.0 to 50 parts by weight of at least one dialkoxysilane, and 0 to 10 parts by weight of at least one tetraalkoxysilane to obtain liquid polyalkylsiloxane resins, (b) impregnating fibrous materials with an effective amount of said siloxane resins to obtain fibrous-siloxane prepregs, (c) drying said fibrous-siloxane prepregs, and (d) subsequently subjecting at least two plies of said fibrous-siloxane prepregs to pressures ranging from 25 psi to 700 psi at temperatures ranging from 50° to 300° C. to obtain said non-flammable cured fibrous-siloxane composites.

2. The process of claim 1 wherein an effective amount of the liquid polyalkylsiloxane resins ranges from 25 to 200% by weight of the fibrous materials.

3. The process of claim 2 wherein the polyalkylsiloxane resins contain from 1.0 to 10 parts by weight of a tetraalkoxysilane.

4. The process of claim 2 wherein the fibrous material comprises fiberglass.

5. The process of claim 2 wherein the fibrous materials comprises carbon fibers.

6. The process of claim 2 wherein 2 to 100 plies of the fibrous prepregs are subjected to pressures of about 50 psi to 500 psi at temperatures of about 100° to 200° C. to obtain the cured siloxane composites.

7. The process of claim 1 wherein about 30 to 70 percent by weight of the aqueous medium comprises lower molecular weight alcohols and a catalytic amount of an inorganic acid or base.

8. The process of claim 1 wherein the fibrous-siloxane prepregs are dried at temperatures ranging up to about 50° C.

9. The process of claim 1 wherein the trialkoxysilane is alkyltrimethoxysilane and the dialkoxysilane is dialkyldimethoxysilane.

10. The process of claim 1 wherein the tetraalkoxysilane is tetraethoxysilane, the trialkoxysilane is alkyltrimethoxysilane, and the dialkoxysilane is dialkyldiethoxysilane.

11. The process of claim 1 wherein the trialkoxysilane is alkyltriethoxysilane and the dialkoxysilane is dialkyldiethoxysilane.

12. The process of claim 1 wherein the tetraalkoxysilane is tetramethoxysilane, the trialkoxysilane is alkyltrimethoxysilane and the dialkoxysilane is dialkyldiethoxysilane.

13. The process of claim 1 wherein the tetraalkoxysilane is present in an amount of about 5 to 10 parts by weight.

14. The process of claim 1 wherein the aqueous medium comprises about 30 to 70 percent by weight of water, and 30 to 70 percent by weight of a lower molecular weight alcohol having 1 to 8 carbons.

15. A non-flammable, cured fibrous-siloxane composite having a density ranging from 1 to 3 g/cc. and a limited oxygen index above 30 comprising at least two plies of a siloxane resin-impregnated fibrous material; said fibrous material being impregnated with an effective amount of said siloxane resin; said siloxane resin derived from the polymerization of about 50 to 95 parts by weight of at least one trialkoxysilane, about 5 to 50 parts by weight of at least one dialkoxysilane and 0 to 10 parts by weight of at least one tetraalkoxysilane.

16. The non-flammable cured fibrous-siloxane composite of claim 15 wherein an effective amount of the siloxane resin ranges about 20 to 60 percent by weight of the composite, and the fibrous material ranges about 40 to 80 percent by weight of the composite.

17. The non-flammable, fibrous-siloxane composite of claim 16 wherein the tetraalkoxysilane ranges about 5 to 10 parts by weight of the resin.

18. The non-flammable fibrous-siloxane composite of claim 17 wherein the composite comprises from 2 to 100 plies of the cured siloxane resin-impregnated fibrous material.

19. The non-flammable cured fibrous-siloxane composite of claim 18 wherein the fibrous material comprises carbon fibers.

20. The non-flammable cured fibrous-siloxane composite of claim 19 wherein the siloxane resins range about 30 to 50 percent by weight of the composite and the carbon fibers range about 50 to 70 percent by weight of the composite.

* * * * *